(12) United States Patent
Nihashi et al.

(10) Patent No.: US 8,693,194 B2
(45) Date of Patent: Apr. 8, 2014

(54) ELECTRONIC APPARATUS (75) Inventors: Kiyotaka Nihashi, Shizuoka (JP); Isao Tsubouchi, Singapore (SG)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 247 days.

(21) Appl. No.: 13/185,588

(22) Filed: Jul. 19, 2011

(65) Prior Publication Data
US 2012/0057299 A1 Mar. 8, 2012

(30) Foreign Application Priority Data
Sep. 3, 2010 (JP) ................................ 2010-197940

(51) Int. Cl.
H05K 7/20 (2006.01)
(52) U.S. Cl.
USPC ........... 361/694; 361/704; 361/707; 361/709; 361/711; 361/713
(58) Field of Classification Search
None
See application file for complete search history.

(56) References Cited

U.S. PATENT DOCUMENTS

| | | | | |
|---|---|---|---|---|
| 5,282,114 A * | 1/1994 | Stone | ....................... | 361/679.51 |
| 5,381,314 A * | 1/1995 | Rudy et al. | .................... | 361/712 |
| 7,133,283 B2 * | 11/2006 | Faneuf et al. | ................. | 361/689 |
| 7,184,266 B1 * | 2/2007 | Chen et al. | ............... | 361/679.21 |
| 7,667,968 B2 * | 2/2010 | Moorer et al. | ................. | 361/697 |
| 7,697,285 B2 * | 4/2010 | Donowho et al. | ............. | 361/690 |
| 7,983,038 B2 * | 7/2011 | Levesque et al. | ............ | 361/692 |
| 8,152,000 B2 * | 4/2012 | Wagner et al. | .................. | 211/26 |
| 8,197,124 B2 * | 6/2012 | Claassen et al. | ................ | 374/29 |

FOREIGN PATENT DOCUMENTS

| | | |
|---|---|---|
| JP | 2008-227260 | 9/2008 |
| JP | 2010-073998 | 4/2010 |

* cited by examiner

*Primary Examiner* — Boris Chervinsky
(74) *Attorney, Agent, or Firm* — Amin, Turocy & Watson, LLP (57) ABSTRACT

An electronic apparatus includes a body frame, a rear frame which is pivotably attached to the body frame, a hole which is formed in a front wall of the body frame, a first heat dissipating member which is placed on the front wall to cover the hole, a thermal conductive member which contacts a portion of the first heat dissipating member at a storage space side and is placed in the hole, a semiconductor chip which is placed on the rear frame, and a second heat dissipating member which is placed on the rear frame to be in contact with the semiconductor chip and receive heat from the semiconductor chip. The second heat dissipating member being in contact with the thermal conductive member in the storage space when the rear frame closes an opening at the rear side of the body frame.

18 Claims, 6 Drawing Sheets

ELECTRONIC APPARATUS

CROSS-REFERENCE TO RELATED APPLICATION

This application is based upon and claims the benefit of priority from Japanese Patent Application No. 2010-197940, filed on Sep. 3, 2010, the entire contents of which are incorporated herein by reference.

FIELD

Embodiments described herein relate generally to an electronic apparatus. In some embodiments the electronic device has a heat dissipating member.

BACKGROUND

Electronic apparatuses, such as POS terminals, personal computers, include heat sources such as a CPU, a power supply unit and so on. In the related art, an electronic apparatus is known in which a plurality of units are installed and whose contact cooling area is enlarged to dissipate heat generated by electronic components in the units while securing the insertability/extractability of the units. In addition, an electronic apparatus capable of efficiently cooling an almost hermetically sealed internal space of a housing has been provided.

However, in such electronic apparatus, since dust may be introduced into the housing by use of a fan, the electronic apparatus may not maintain sufficient cooling efficiency over a long period of time. Moreover, if the fan is out of order, the electronic apparatus may not be cooled efficiently. In this case, the cooling efficiency is significantly lowered.

DETAILED DESCRIPTION

According to one embodiment, an electronic apparatus includes a body frame having a front wall in a front side of the body frame and being open in a rear side of the body frame; a rear frame attached to the body frame and configured to alternate its position between a position where the rear frame closes an opening at the rear side of the body frame and a position where the rear frame is separated from the opening; a hole provided in the front wall of the body frame allowing external air to enter a storage space which is defined by the body frame and the rear frame when the rear frame closes the opening; a first heat dissipating member covering the hole in the front wall; a thermal conductive member provided in the hole, the thermal conductive member being in contact with a portion of the first heat dissipating member at the storage space side; a semiconductor chip provided on the rear frame; and a second heat dissipating member being in contact with the semiconductor chip to receive heat from the semiconductor chip. The second heat dissipating member is in contact with the thermal conductive member in the storage space when the rear frame closes the opening.

Embodiments will now be described in detail with reference to the drawings. In the following description and the drawings, like reference numerals refer to the same or similar configurations and functions and explanation thereof will not be repeated.

Figure 1:
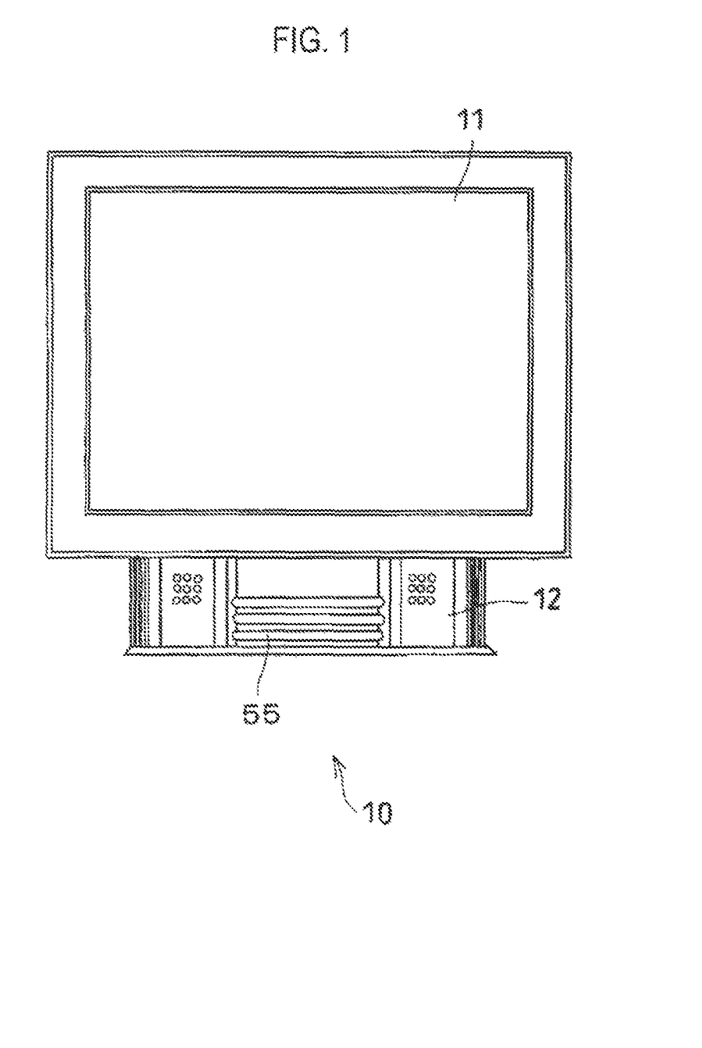
FIG. 1 is a front view of an electronic apparatus according to an embodiment.
Figure 2:
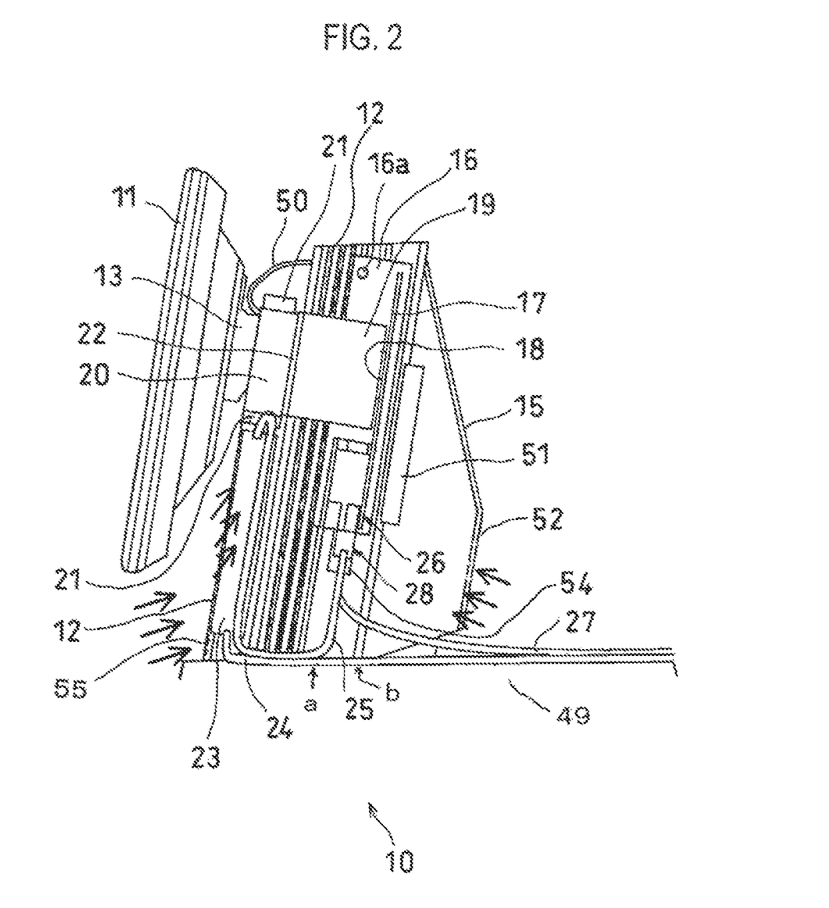
FIG. 2 is a diagram showing a longitudinal sectional structure of the electronic apparatus in a state where a rear frame of the electronic apparatus is closed.
Figure 3:
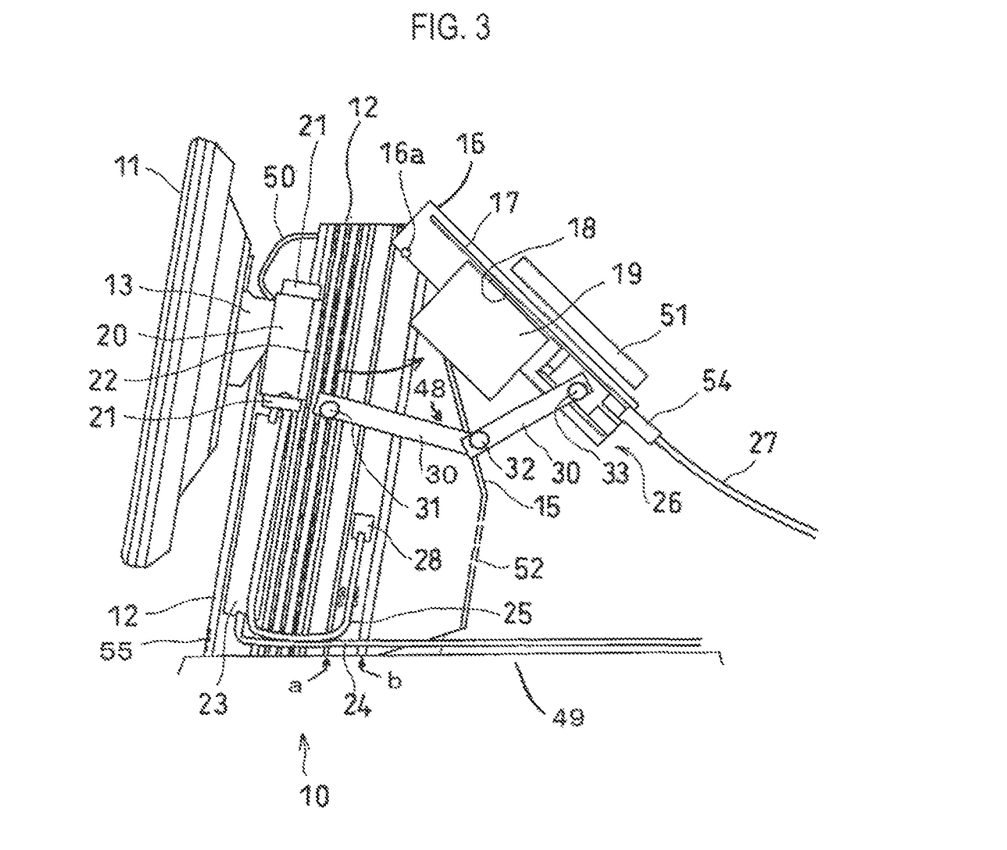
FIG. 3 is a diagram showing a longitudinal sectional structure of the electronic apparatus in a state where the rear frame of the electronic apparatus is opened.
Figure 4A:
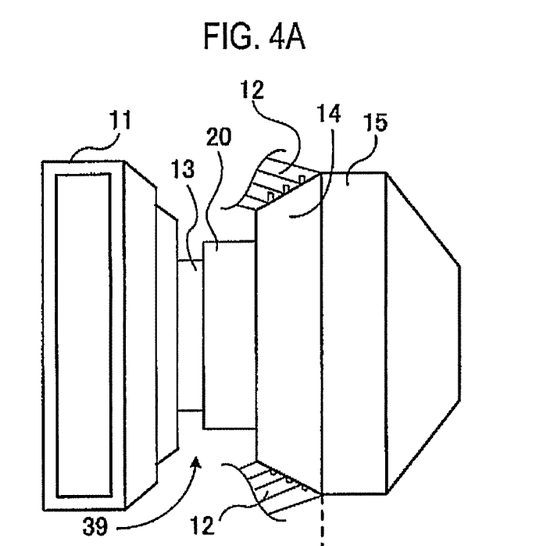
FIG. 4A is a top view of the electronic apparatus.
Figure 4B:
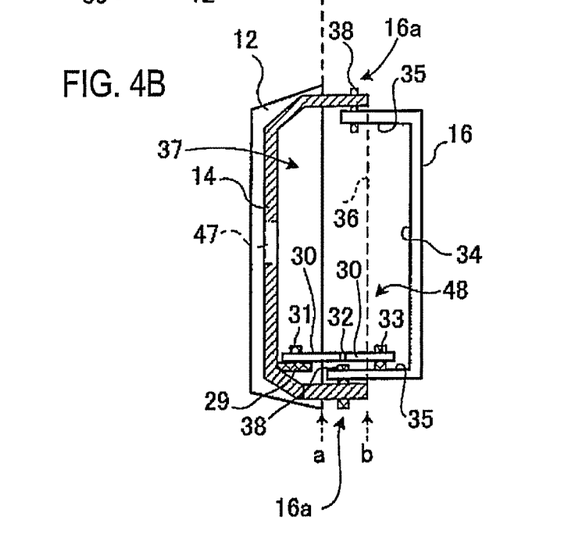
FIG. 4B is a diagram showing a cross section of the electronic apparatus.

According to one embodiment, an electronic apparatus may be a POS (Point-Of-Sales) terminal for registering sales information of goods and so on. FIG. 1 is a front view of a POS terminal according to one embodiment. FIG. 2 is a diagram showing a longitudinal sectional structure viewed from the right side of the POS terminal. FIG. 2 shows an arrangement of internal parts of the POS terminal in a state where a rear frame 16 is closed. FIG. 3 is a diagram showing a longitudinal sectional structure viewed from the right side of the POS terminal. FIG. 3 shows an arrangement of internal parts in a state where the rear frame 16 is opened. In FIGS. 2 and 3, some parts such as an inner heat sink 19, an outer heat sink 20, and a thermal conductive sheet 22 are perspectively depicted. FIG. 4A is a top view of the POS terminal. In this figure, a body frame 14 and the outer heat sink 20 are depicted with the body cover 12 removed while both right and left sides of the body cover 12 is left connected to the POS terminal. FIG. 4B is a diagram showing a cross sectional structure of the POS terminal viewed from the top. Throughout these figures, like reference numerals refer to the same or similar elements.

A POS terminal 10 includes a display 11 serving as a panel configured to display and manipulate information, the body cover 12 placed in the rear side of the display 11, a rear cover 15 coupled to the body cover 12, a body frame 14 placed within the body cover 12, a rear frame 16 which is pivotably attached to the body frame 14 and has a flat portion, and a mother board 17 mounted on the flat portion of the rear frame 16. In addition, the POS terminal 10 includes a CPU 18 (e.g., implemented as a semiconductor chip) placed on the mother board 17, which is a printed circuit board, the outer heat sink 20 (referred to as a "first heat dissipating member") which dissipates heat generated from the CPU 18 to the external air, the inner heat sink 19 (referred to as a "second heat dissipating member") which receives heat generated from the CPU 18, and a thick elastic thermal conductive sheet 22 (referred to as a "thermal conductive member") which conducts heat transferred from the inner heat sink 19 to the outer heat sink 20.

The POS terminal 10 may be placed on a box-type cash drawer 49. The POS terminal 10 may be configured to output print data to a printing device (not shown). The display 11 is attached to the body cover 12 via a neck portion 13. The display 11 may receive display data from the CPU 18 via a wiring such as a cable 50 and display information based on the display data.

The POS terminal 10 has a body structure configured to stand in a backward-inclined posture (e.g., slightly inclined to the right side in FIGS. 2 and 3) when the display 11, the body cover 12 and the rear cover 15 are integrally assembled. This body structure allows the POS terminal 10 to be backwardly biased. Under a state where the rear frame 16 is closed, the mother board 17 is positioned vertically in a backward-inclined posture within a storage space of the POS terminal 10. The inner heat sink 19 projects forward (e.g., to the left side where the display 11 is disposed in FIGS. 2 and 3) from the mother board 17. As the POS terminal 10 is disposed in an inclined posture having an L-shape (when viewed from the right side of the POS terminal 10 as shown in FIGS. 2 and 3), the POS terminal 10 keeps a weight balance in relation to the forward-applied weight made by the components including the inner heat sink 19, the display 11, a power supply 23 and so on. Further, because the mother board is vertically placed in the POS terminal 10, an area where the bottom of the body cover 12 and the rear cover 15 contacts the top of the cash drawer 49 is reduced. With the above configuration, the POS terminal 10 along with a printing device may be placed on one cash drawer 49. Further, a user may perform a touch operation on the display 11 even if the POS terminal 10 is placed on a small table whether it is installed indoors or outdoors.

The body cover 12 may be a mold made of synthetic resin, for example, plastic. Vent holes 55 are formed in a lower portion of the body cover 12. The vent holes 55 are intakes of external air, which is guided to the power supply 23. A plurality of ribs for supporting the body frame 14 are formed in the inner side of the body cover 12. A plurality of stepped groove-shaped portions are formed in parallel with each other in the outer side of the body cover 12. These stepped groove-shaped portions may form three lines when they are viewed from the side of the POS terminal 10.

The body frame 14 may be made of metal. The body frame 14 has a front wall 53 (see FIG. 5) in the front side thereof while it is open in the rear side. As shown in FIG. 4A, between a front wall of the body cover 12 and the back side of the display 11, a gap 39 is formed in which the outer heat sink 20 and the power supply 23 are placed.

The rear cover 15 may also be a mold made of synthetic resin, for example, plastic. A plurality of ribs for supporting the rear frame 16 are formed in the inner side of the rear cover 15. Vent holes 52 are formed in a lower portion of the rear cover 15. These vent holes 52 are intakes of external air, which is guided to the rear side of the mother board 17. In the drawings, a symbol "a" denotes a joint portion between the body cover 12 and the rear cover 15. Further, a symbol "b" denotes an end portion of the circumferential wall of the body frame 14, which forms an opening section 36.

The rear frame 16 may be made of metal. As shown in FIG. 4B, the rear frame 16 includes, for example, a flat portion 34 to which the mother board 17 is fixed, and standing portions 35 which is coupled to the flat portion 34 and are pivotably fixed to the body frame 14. Each of the standing portions 35 may be formed by folding a panel member at its left and right end portions (e.g., top and bottom portions thereof in FIG. 4) and is pivotably supported by the body frame 14. Pivot portions 16a allow the rear frame 16 to be alternately disposed either at a position to close the opening section 36 at the rear side of the body frame 14, or at a position apart from the opening section 36. The rear frame 16 may be engaged to the body frame so that it can be held in a static posture at the above two positions. In a state where the rear frame 16 closes the opening section 36, the body frame 14 along with the rear frame 16 define a storage space 37. A pin member, a shaft or a hinge mechanism may be used for the pivot portions 16a. In the example as shown in FIG. 4B, the pivot portions 16a include two shaft holes formed in the opposing circumferential walls formed at open ends of the body frame 14, two pin members 38 inserted in the two shaft holes, and shaft holes formed in the circumferential wall of the rear frame 16.

In addition, as shown in FIGS. 3 and 4B, the body frame 14 and the rear frame 16 are connected by a link mechanism 48. The link mechanism 48 has two arms 30. A degree of opening/closing of the rear frame 16 may be adjusted based on an angle of intersection of the arms 30 in the longitudinal direction. In the rear wall of the body frame 14, a projection 29 is formed. A bearing 31 such as a shaft is attached to the projection 29. One end of one arm 30 is pivotably supported to the bearing 31 and the other end of the arm 30 is pivotably supported to a bearing 32, to which one end of the other arm 30 is connected. Another bearing 33 such as a shaft, which is pivotably supported by the other end of the other arm 30, is pivotably supported by the inner wall of the standing portions 35 of the rear frame 16.

In a state where the rear frame 16 is closed by narrowing the angle of intersection of the arms 30 in the link mechanism 48, the inner heat sink 19 is positioned in the storage space 37. The mother board 17 is screwed to the flat portion 34 of the rear frame 16 via a spacer or the like. The mother board 17 is attached/detached to/from the body cover 12 by rotating a lower end of the mother board 17 (which is opposite the other end thereof facing the pivot portion 16a), drawing a circular arc around the pivot portion 16a as an axial center. The inner heat sink 19 and the CPU 18 are integrally attached and wired to the front side of the mother board 17. A hard disk drive 51 is attached and wired to the rear side of the mother board 17.

Referring back to FIG. 2, electronic components 26 are also mounted on the front side of the mother board 17. The electronic components' 26 may include, for example, a RAM and a ROM cooperating with the CPU 18, a power supply, an interface circuit for the display 11, an interface circuit for a LAN and a USB, etc. The power supply 23 is connected to a commercial AC source or a power adaptor via a cord 24 and supplies power to the mother board 17 via a cord 25 and a socket 28. The mother board 17 supplies power to the display 11 via the cable 50 and transmits display data to the display 11 via another cable (not shown). A connector 54 is connected to a LAN cable 27. The CPU 18 may communicate with a management server via a dedicated communication link. The CPU 18 may also transmit journal information stored in the hard disk drive 51 to a USB memory or the like in a USB format. The CPU 18 may transmit receipt information to a printing device coupled to the POS terminal 10.

Figure 5:
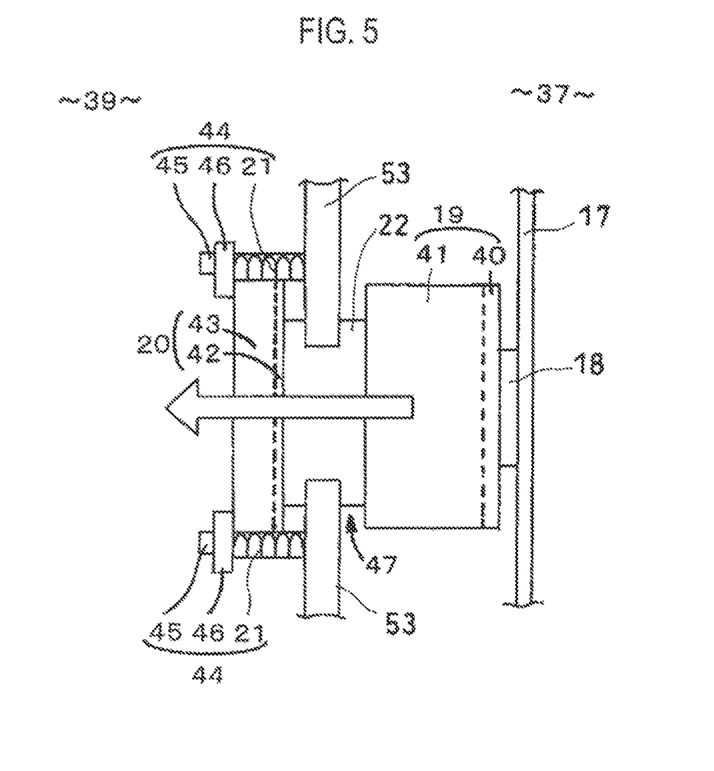
FIG. 5 is an enlarged side view of a cooling device according to one embodiment, including a first heat dissipating member, a second heat dissipating member and a thermal conductive member.

FIG. 5 is an enlarged side view of a cooling device in a POS terminal according to one embodiment, including the inner heat sink 19, the outer heat sink 20 and the thermal conductive sheet 22. In FIG. 5, the same reference numerals as in the above-described figures denote the same or similar elements. The left side of FIG. 5 corresponds to the front side of the body structure of the POS terminal 10, and the right side of FIG. 5 corresponds to the rear side of the body structure.

The CPU 18 may be a heat generating body which generates heat. In one embodiment, the inner heat sink 19 includes a rectangular metal plate 40 facing the mother board 17 side and a plurality of plate-shaped fins 41 (only one fin 41 being shown in FIG. 5) facing the display 11 side. The metal plate 40 is fixed to the top surface of the CPU 18. For example, the bottom surface of the metal plate 40 is fixed to the top surface of the CPU 18 by means of adhesion or bonding. The fins 41 are configured to expand a surface area of the metal plate 40 (and the CPU coupled thereto) for performing effective cooling. The position of the fins 41 are alternated by rotation of the rear frame 16, as follows. The fins 41 may be disposed at a position where the fins contact an exposed portion of the thermal conductive sheet 22 such that leading ends of the fins are somewhat buried in the thermal conductive sheet 22. On the other hand, the fins 41 may be disposed at a position where the leading ends of the fins are separated from the thermal conductive sheet 22. In a state where the rear frame 16 is closed, all the leading ends of the fins 41 are pressed against the thermal conductive sheet 22 so that heat generated from the CPU 18 is transferred to the thermal conductive sheet 22.

In this embodiment, the POS terminal 10 includes a heat sink structure that is divided into two sub-structures, e.g., the inner heat sink 19 for the inside of the body structure of the POS terminal 10, and the outer heat sink 20 for the outside of the body structure of the POS terminal 10. Such two sub-structures dissipate heat integrally. The thermal conductive sheet 22 acts as an insulator member which absorbs a force urged from the inside and outside of the body structure of the POS terminal 10, in addition to an interface for thermal conduction. As used herein, the term "insulator" refers to an insulating member which prevents transfer of force between the two opposite sides. That is, the thermal conductive sheet 22 is a thermal interface configured to act as an insulator. With the configuration as described above, the POS terminal 10 includes a fan-less cooling structure.

In addition, a hole 47 is formed in the front wall 53 of the body frame 14. This hole 47 is, for example, a through hole. The hole 47 communicates between the storage space 37, which is a partitioned space within the body cover 12, and external air. The thermal conductive sheet 22 is inserted in the hole 47. The thermal conductive sheet 22 may be made of a thermal conductive material, for example, a silicon rubber. The thermal conductive sheet 22 includes a structure widened outward from the circumference of the hole 47 in the radial direction when the thermal conductive sheet 22 is inserted in the hole 47. The thermal conductive sheet 22 is in contact with the inner heat sink 19 and the outer heat sink 20 at both sides of the hole 47. The thermal conductive sheet 22 maintains its contact with the outer heat sink 20 at the storage space 37 side of the outer heat sink 20.

The thermal conductive sheet 22 absorbs a force exerted from the inside and outside of the body structure of the POS terminal 10. If a force is applied from the outer heat sink 20 toward the thermal conductive sheet 22, the thermal conductive sheet 22 acts as a buffer to prevent the force from being transferred to the mother board 17, such that a significant force is not unnecessarily exerted on the mother board 17. The thermal conductive sheet 22 may be made of flame-retardant material. As used herein, the term "flame-retardant" refers to a high level of combustion grade material as defined by, for example, a UL (Underwriters Laboratories Inc.) standard. As such, the POS terminal 10 is provided with the thermal conductive sheet 22 serving as an insulator, which is placed in the inner side of the outer heat sink 20, the thermal conductive sheet 22 also acts as a cover member.

The outer heat sink 20 is disposed to cover the hole 47 and also faces the front side of the body cover 12. Heat generated from the CPU 18 is transferred from the inner heat sink 19 to the outer heat sink 20 via the thermal conductive sheet 22 and is dissipated to external air. The outer heat sink 20 includes a metal plate 42 which is pressed against the thermal conductive sheet 22, and a plurality of fins 43 (only one of the fins 43 being shown in FIG. 5) which are formed in parallel to each other on the metal plate 42 for heat transfer to external air. The fins 43 are configured to expand a cooling surface area of the outer heat sink 20. The outer heat sink 20 is biased from the external air side to the body frame 14 by an elastic force from a biasing mechanism 44, which will be described below. The outer heat sink 20 is pressed toward a front surface of the front wall 53 such that the outer heat sink 20 can come in close contact with the thermal conductive sheet 22.

The biasing mechanism 44 includes, for example, a plurality of studs 45, springs 21 and pressing members 46. The plurality of studs 45 are formed on the front surface of the front wall 53 in the circumference of the hole 47. Further, the springs 21 are installed on the cylindrical outer side of the studs 45. A tap hole may be formed on each stud 45. Each stud 45 is engaged with the pressing member 46. The pressing members 46 may include screws, bolts, nuts, washers, etc. For example, screws may exert a pressing force against the outer heat sink 20 in a direction toward the front surface of the front wall 53.

The thermal conductive sheet 22 is thicker than the front wall 53 of the body frame 14. A portion of the thermal conductive sheet 22, which contacts the inner wall of the hole 47, has a circular shape. Both end portions of the thermal conductive sheet 22 in the sheet thickness direction are exposed to the storage space 37 side and the gap 39 side, respectively. The gap 39 is filled with external air. The biasing mechanism 44 presses the thermal conductive sheet 22 from the external air side, such that the thermal conductive sheet 22 at the storage space 37 side is in contact with the inner heat sink 19 closely. The biasing mechanism 44 also finely adjusts a position of the outer heat sink 20 on the front wall surface of the body cover 12. With the configuration as described above, a contact force exerted on a contact area between the inner heat sink 19 and the storage space 37 side of the thermal conductive sheet 22 may increase a heat transfer effect.

In assembling the POS terminal 10 with the above-described configuration, the pivot portion 16a is constructed and then the body frame 14 is fitted to the rear frame 15, thereby completing a frame structure of the POS terminal 10. The mother board 17 is then inserted into the frame structure vertically from the rear bottom side of the POS terminal 10.

As shown in FIG. 2, the inner heat sink 19 is attached to the mother board 17. The inner heat sink 19 contacts the thermal conductive sheet 22 in a state where the POS terminal 10 is integrally constructed. In this case, the thermal conductive sheet 22 remains attached to the body cover 12, to which the outer heat sink 20 held by spring force of the biasing mechanism 44 is attached.

The POS terminal 10 performs various processes such as displaying of information on goods, reception of instructions from users, sales registration, etc. There may be a case where a small-sized POS terminal 10 is used outdoors such as in an exhibition hall as well as indoors. In this case, the cash drawer 49, the POS terminal 10 and the printing device may be installed on a desk. For example, assuming that a user performs a register operation in a dusty parking lot, the POS terminal 10 having the fan-less structure may be used continuously even in such a dusty place without deterioration of cooling efficiency due to introduction of dust. In addition, since a circuit board block of the mother board 17 may be taken out intact by separating the rear frame 16 from the body cover 12 in the manner as described above, it is very easy to perform a maintenance operation.

In case the POS terminal 10 is to be checked for maintenance, the user may take the rear cover 15 off and open the rear frame 16. Then, the POS terminal 10 is in a state where a printed circuit board unit is separated from the body structure, as shown in FIG. 3. In this case, the thermal conductive sheet 22 and the outer heat sink 20 are left at the body side while the inner heat sink 19 is attached to the print circuit board unit. After the maintenance check, the user may close the rear frame 16 and attach the rear cover 15 to the body structure. When the printed circuit board unit is again attached to the body structure, the outer heat sink 20 contacts the inner heat sink 19. Since the outer heat sink 20 continues to be pressed from an external air side toward the body side by the spring 21, the outer heat sink 20 may be in contact with the inner heat sink 19 while maintaining an appropriate contact area therebetween.

An external dimension of the inner heat sink 19, an external dimension of the outer heat sink 20 and a thickness of the thermal conductive sheet 22 may have respective dimension errors. When the inner heat sink 19, the outer heat sink 20 and the thermal conductive sheet 22 are assembled in the POS terminal 10, irregularities within assembly tolerances may occur, which may result in an irregular distribution of pressing force from both sides of the thermal conductive sheet 22. A size and position of the hole 47 may be shifted in the front wall 53 of the body frame 14 within an allowable limit of tolerance. In this embodiment, when the rear frame 16 is rotated, the inner heat sink 19 contacts the inner side of the thermal conductive sheet 22 in the rotation direction. The surface of the thermal conductive sheet 22 is substantially flat and the inner heat sink 19 is inclined to contact the surface. Accordingly, the POS terminal 10 may obtain a contact area appropriate for cooling. In addition, as the biasing mechanism 44 finely adjusts a position of the outer heat sink 20, this may compensate for their dimension errors, irregularities within assembly tolerances, pressing force deviation and misalignment. Even if an excessive assembling force inside the POS terminal 10 exists, it is possible to maintain a close contact among the inner heat sink 19, the thermal conductive sheet 22 and the outer heat sink 20 without damaging an effect of an elastic force by the spring 21.

If there is no support by a spring force of the biasing mechanism 44 or the like, when the thermal conductive sheet 22 and the inner heat sink 19 are inclined to contact each other, a contact portion therebetween may form a linear contact on a horizontally extended line or may form a surface contact on a narrow-width surface. In this case, a sufficient area required for heat transfer may not be obtained. In addition, in case of a line contact or an insufficient surface contact formed between the thermal conductive sheet 22 and the inner heat sink 19, one end of the thermal conductive sheet 22 may projects toward an inner space of the body structure. Therefore, the thermal conductive sheet 22 is likely to be separated from the contact portion between the thermal conductive sheet 22 and the inner heat sink 19. Further, the thermal conductive sheet 22 may not be maintained at a fixed position.

In contrast, this embodiment employs a structure where the contact portion between the thermal conductive sheet 22 and the inner heat sink 19 may be flexibly adjusted (i.e., an amount of force exerted on the both sides may be finely adjusted). With such an adjustable structure, it is possible to obtain an appropriate contact area even when the mother board 17 is detached/attached from/to the body structure by rotating along one end portion thereof with an arc shape. Further, with the adjustable structure, even when the printed circuit board unit and so on are inserted from the rear bottom side toward the front top side of the POS terminal 10, it is possible to avoid contact with an edge of the inner heat sink 19 with the thermal conductive sheet 22. This facilitates securing a sufficient contact area for thermal transfer.

Figure 6:
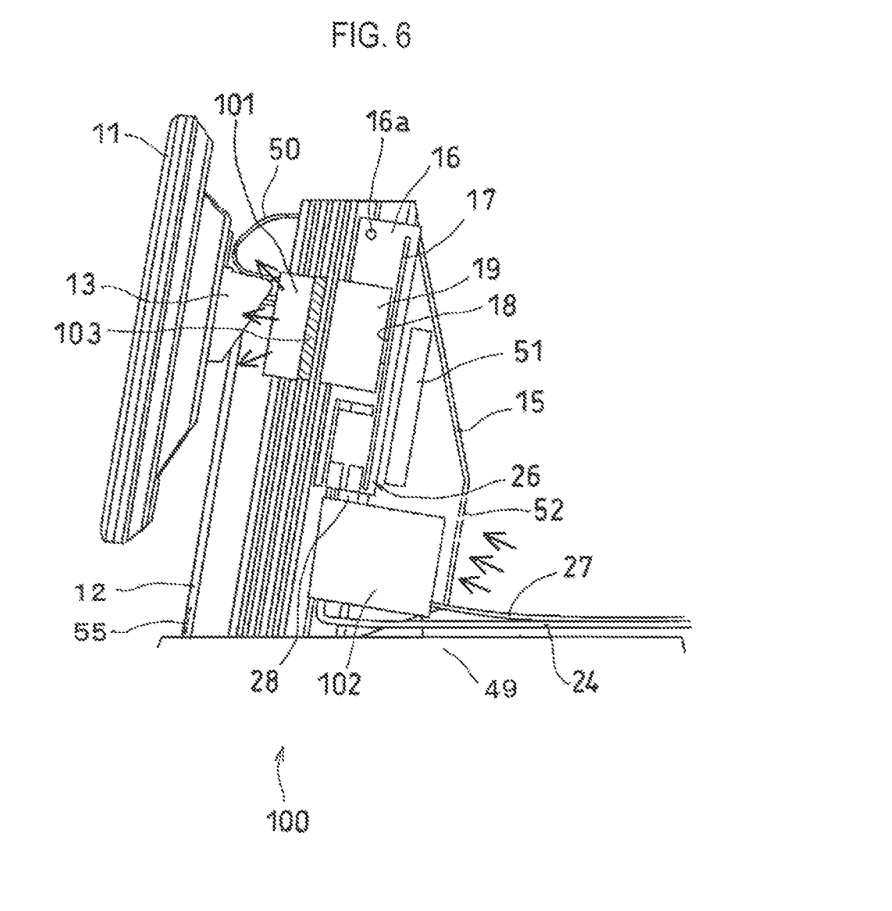
FIG. 6 is a right side view of an electronic apparatus.

FIG. 6 is a right side view of a POS terminal. In FIG. 6, the same reference numerals as in the above-described figures denote the same or similar elements. A POS terminal 100 includes a mesh plate 103 mounted on the inner heat sink 19 and a fan 101 mounted on the mesh plate 103. With this structure, the inner heat sink 19 absorbs heat generated from the CPU 18. The fan 101 absorbs air from vent holes 52 formed on the rear side of the body structure of the POS terminal 100. The cooling air absorbed in this way exchanges heat with the inner heat sink 19 through an internal space of the POS terminal 100 and then is discharged outside. Since the fan 101 generates air flow, dust may enter the POS terminal 100 from the outside.

In contrast, in this embodiment, the POS terminal 10 includes the fan-less structure where the thermal conductive sheet 22 prevents external substances, such as dust, water, oil and so on, from entering the body structure. Even when the POS terminal 100 is placed near, for example, a kitchen in a shop, it is possible to prevent water and oil from entering the body structure and also prevent dust from staying within the body structure. In addition, even if the body structure is splashed with water, the water cannot enter the body structure and the POS terminal 10 may continue to perform a cooling operation. This facilitates maintenance of sufficient cooling efficiency over a long period of time.

In addition, since the rear frame 16 is operable to be opened/closed with respect to the body frame 12, the POS terminal 10 has an advantage over conventional examples in terms of workability.

In this embodiment, since a rotation center for opening the rear frame 16 is positioned apart from the CPU 18 and the spring 21 is provided to press the outer heat sink 20, components inside the body structure can be reliably mounted even if they are somewhat misaligned during the opening/closing of the rear frame 16. In the conventional example, when a part is to be attached to the POS terminal in a vertical direction, a space sufficient for part attachment may not be secured. Further, since the part and the space including the part are narrow, it is difficult to access the part. In contrast, since the POS terminal 10 allows attachment of the mother board 17 and the electronic parts 26 by rotation of the rear frame 16, the user may check the interior of the POS terminal through the opened rear frame 16. Accordingly, this embodiment is superior to the conventional example in terms of workability and mountability.

A system of providing a biasing force for close contact between the outer heat sink 20 and the thermal conductive sheet 22 in this embodiment may be modified in various ways. For example, while the biasing mechanism 44 includes the studs 45, the springs 21 and the pressing members 46, the effect equivalent to the biasing mechanism 44 may be achieved by forming boss portions in advance in the front wall 53 of the body frame 14, joining the boss portions to the front wall 53 by means of screws and the like with the springs 21 interposed therebetween, and pressing the outer heat sink 20 against the front wall 53 by means of screw sheets or nuts. Screws may be replaced with the boss portions.

The biasing mechanism 44 may employ metal leaf springs placed around sides of the outer heat sink 20. One or both ends of each leaf spring are fixed to the front wall 53 of the body frame 14 and the outer heat sink 20 is pressed against the front wall 53 by means of the middle portion of each leaf spring. Elastic deformation by the leaf springs may achieve an effect equivalent to the above example.

Although in the above embodiments, the outer heat sink 20 and the inner heat sink 19 are used as the first heat dissipating member and the second dissipating member, respectively, heat pipes may be used as these heat dissipating members or a combination of a heat sink and a heat pipe may be used as the heat dissipating members. The outer heat sink 20 and the inner heat sink 19 may have different shapes, respectively.

The fins 17 and 43 may be changed in their shape and a portion thereof may have an uneven shape or a groove shape. A material such as grease having high thermal conductivity may be applied to various parts of the fins.

Although in the above embodiments the inner heat sink 19 is fixed to the top of the CPU 18, the inner heat sink 19 may have a concave portion, which is formed in the bottom of the metal plate 40 and has a dimension slightly larger than the dimension of four sides of the CPU 18, in which the CPU 18 is accommodated, with the top of the CPU 18 being in contact with the ceiling of the concave portion. The thermal conductive member may use a thick rubber material instead of the thermal conductive sheet 22.

A personal computer may be used as the electronic apparatus.

In the above embodiments, the diameter of the hole 47 is, for example, several millimeters, as determined in consideration of heat dissipation efficiency and limitations defined by the UL standard. Forming the hole 47 having a large diameter increases an area of contact surface between the inner heat sink 19 and the outer heat sink 20. When the hole 47 has a large diameter, by using a material having a high level of combustion grade for the thermal conductive sheet 22, the POS terminal 10 can meet the requirements of the UL standard even if the thermal conductive sheet 22 is used as a cover member.

While certain embodiments have been described, these embodiments have been presented by way of example only, and are not intended to limit the scope of the inventions. Indeed, the novel apparatuses described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a body frame including a front wall in a front side of the body frame and being open in a rear side of the body frame;
   a rear frame attached to the body frame and configured to alternate its position between a position where the rear frame closes an opening at the rear side of the body frame and a position where the rear frame is separated from the opening;
   a hole provided in the front wall of the body frame allowing external air to enter a storage space which is defined by the body frame and the rear frame when the rear frame closes the opening;
   a first heat dissipating member covering the hole in the front wall;
   a thermal conductive member provided in the hole, the thermal conductive member being in contact with a portion of the first heat dissipating member at the storage space side;
   a semiconductor chip provided on the rear frame; and
   a second heat dissipating member being in contact with the semiconductor chip to receive heat from the semiconductor chip, the second heat dissipating member being in contact with the thermal conductive member in the storage space when the rear frame closes the opening.

2. The electronic apparatus of claim 1, further comprising a mother board provided on the rear fame,
   wherein the second heat dissipating member and the semiconductor chip are attached to the mother board and the mother board is separable from the body frame when a lower end of the mother board, which is opposite to the other end thereof facing a pivot portion of the rear frame, is rotated around the pivot portion.

3. The electronic apparatus of claim 1, further comprising a biasing mechanism provided in the circumference of the hole on a front surface of the front wall and configured to elastically press the first heat dissipating member toward the thermal conductive member, wherein the biasing mechanism presses one side of the thermal conductive member from the external air side such that the other side of the thermal conductive member at the storage space side is in contact with the second heat dissipating member.

4. The electronic apparatus of claim 3, wherein the biasing mechanism adjusts a position of the first heat dissipating member with respect to the body frame and secures a contact force exerted on a contact portion between the second heat dissipating member and the other side of the thermal conductive member.

5. The electronic apparatus of claim 1, wherein the thermal conductive member is a thermal conductive sheet made of silicon rubber.

6. The electronic apparatus of claim 1, wherein the thermal conductive member is a thermal conductive sheet made of flame retardant material.

7. The electronic apparatus of claim 1, wherein the thermal conductive member absorbs force applied from the first heat dissipating member to the second heat dissipating member and force applied from the second heat dissipating member to the first heat dissipating member.

8. An electronic apparatus comprising:
   a body frame including a front wall in a front side of the body frame and configured to be opened in a rear side of the body frame;
   a rear frame attached to the body frame and configured to alternate its position between a position where the rear frame closes an opening at the rear side of the body frame and a position where the rear frame is separated from the opening;
   a hole provided in the front wall of the body frame allowing external air to enter a storage space which is defined by the body frame and the rear frame when the rear frame closes the opening;
   a thermal conductive member provided in the hole;
   a first heat dissipating member provided on a front side surface of the front wall of the body frame to be in contact with the thermal conductive member;
   a semiconductor chip provided on a storage space side surface of the rear frame; and
   a second heat dissipating member provided on the rear frame to be in contact with the semiconductor chip to receive heat from the semiconductor chip,
   wherein the second heat dissipating member is in contact with the thermal conductive member in the storage space when the rear frame closes the opening.

9. The electronic apparatus of claim 8, further comprising a biasing mechanism provided in the circumference of the hole on the front wall surface of the front wall and configured to elastically press the first heat dissipating member toward the thermal conductive member.

10. The electronic apparatus of claim 8, wherein the thermal conductive member is a thermal conductive sheet made of silicon rubber.

11. An electronic apparatus comprising:
    a thermal conductive member provided in a hole in a front wall of a body frame, the thermal conductive member being made of a thermal conductive material;
    a first heat dissipating member in contact with the thermal conductive member;
    a semiconductor chip provided on a rear portion of the body frame; and
    a second heat dissipating member in contact with the semiconductor chip and the thermal conductive member.

12. The electronic apparatus of claim 11, further comprising a mother board provided on the rear fame,
 wherein the second heat dissipating member and the semiconductor chip are attached to the mother board.

13. The electronic apparatus of claim 11, further comprising a biasing mechanism provided in the circumference of the hole on a front surface of the front wall.

14. The electronic apparatus of claim 13, wherein the biasing mechanism adjusts a position of the first heat dissipating member with respect to the body frame.

15. The electronic apparatus of claim 14, wherein the thermal conductive member is a thermal conductive sheet made of silicon rubber.

16. The electronic apparatus of claim 15, wherein the thermal conductive member is a thermal conductive sheet made of flame retardant material.

17. The electronic apparatus of claim 11, wherein the thermal conductive member absorbs force applied from the first heat dissipating member to the second heat dissipating member and force applied from the second heat dissipating member to the first heat dissipating member.

18. The electronic apparatus of claim 11 wherein the first heat dissipating member covers the hole.

\* \* \* \* \*